(12) United States Patent
Cheng et al.

(10) Patent No.: US 8,919,985 B2
(45) Date of Patent: Dec. 30, 2014

(54) BACKLIGHT MODULE AND THERMAL DESIGN THEREOF

(71) Applicant: AU Optronics Corporation, Hsin-Chu (TW)

(72) Inventors: Chieh-Jen Cheng, Hsin-Chu (TW); Po-Hung Chen, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 155 days.

(21) Appl. No.: 13/650,700

(22) Filed: Oct. 12, 2012

(65) Prior Publication Data

US 2013/0208509 A1 Aug. 15, 2013

(30) Foreign Application Priority Data

Feb. 10, 2012 (TW) .............................. 101104339 A

(51) Int. Cl.
*F21V 29/00* (2006.01)
*F21V 8/00* (2006.01)

(52) U.S. Cl.
USPC .......................................... 362/113; 362/611

(58) Field of Classification Search
CPC .... G02F 1/1335; G02F 1/133608; G02B 6/00
USPC .......... 362/600, 294, 609, 613, 611, 631, 561
See application file for complete search history.

(56) References Cited

U.S. PATENT DOCUMENTS

| 7,553,055 B2 | 6/2009 | Liu |
|---|---|---|
| 2007/0133221 A1 | 6/2007 | Liu |
| 2011/0255030 A1 | 10/2011 | Pei |
| 2012/0014135 A1* | 1/2012 | Kim .............................. 362/623 |
| 2012/0293719 A1* | 11/2012 | Negoro ......................... 348/725 |

FOREIGN PATENT DOCUMENTS

| CN | 1979308 A | 6/2007 |
|---|---|---|
| CN | 201133990 Y | 10/2008 |

(Continued)

OTHER PUBLICATIONS

English translation of abstract of TW I342974.
English translation of abstract of TW M406752.
English translation of abstract of CN 201133990 Y (published Oct. 15, 2008).

(Continued)

*Primary Examiner* — Elmito Breval
(74) *Attorney, Agent, or Firm* — McClure, Qualey & Rodack, LLP

(57) ABSTRACT

A backlight module includes a light guide plate, a light source module, a supporting frame, and a heat conductive glue layer. The light guide plate has a light-entering end; the light source module is disposed corresponding to the light-entering end and includes a flexible circuit board and a plurality of light sources. The flexible circuit board extends along the light-entering end and has a light source-bearing area and a heat-dissipating area, wherein a width of the heat-dissipating area in a direction perpendicular to the light-entering end is not smaller than a width of the light source-bearing area. The plurality of light sources are disposed in the light source-bearing area. The supporting frame has a holding portion which is bent to form an accommodation space for accommodating the light source module and the light-entering end. The heat conductive glue layer is disposed between the heat-dissipating area and an inner side of the holding portion for conducting heat from the heat-dissipating area to the holding portion.

18 Claims, 7 Drawing Sheets

(56) References Cited

FOREIGN PATENT DOCUMENTS

| TW | 200722833 | 6/2007 |
| TW | M324216 | 12/2007 |
| TW | I342974 | 6/2011 |
| TW | M406752 | 7/2011 |

OTHER PUBLICATIONS

China Office Action dated Jul. 25, 2013.
Taiwan Office Action dated Sep. 29, 2014.

* cited by examiner

BACKLIGHT MODULE AND THERMAL DESIGN THEREOF

BACKGROUND OF THE INVENTION

1. Field of the Invention

The present invention generally relates to a backlight module and thermal design thereof.

2. Description of the Prior Art

Backlight module is extensively used in a variety of electronic devices such as displaying devices including laptops, tablets, televisions, or mobile phones. The laptops and the tablets are both portable computers; however, compared to the laptops, there is a greater requirement for mobility and convenience with regard to the tablets. In addition, the tablets are usually equipped with touch interfaces so that they have concise appearance. The concise appearance and the flexibility in manipulation let the users be able to use tablets or other related products at any time and any place. In other words, the tablets and other related products are not limited to be used indoors or in a specific location but can be used outdoors or versatile environment.

As FIG. 1A shows, luminance provided by the conventional backlight module such as those used in the laptops is enough for the users working indoors, but environment light may cause insufficient luminance of the displaying devices in outdoor environment. In order to enhance luminance for the displaying devices being suitable to work outdoors, the light source density may be increased. However, the way of increasing light source density may result in temperature rising of the light source module, deformation of the optical sheets, influence on rotation of the liquid crystal molecules.

As a result, it is a conventional way to use a supporting frame having greater heat conduction efficiency for backlight module, wherein the area of the supporting frame is further increased to facilitate heat dissipating. However, increasing the area of supporting frame will increase the production cost as well as the weight of supporting frame, impairing the portability and flexibility of portable computers. On the other hand, in the conventional backlight module shown in FIG. 1B, a light source module 3 is usually fastened to a supporting frame 4 by means of a single-sided adhesive tape 5; however, the light source module 3 and the supporting frame 4 are not tightly connected, resulting in an air layer A between the light source module 3 and the supporting frame 4. Since the air has a relatively small heat-conduction coefficient, the conventional backlight module 9 is not sufficient for heat conduction and heat dissipation of the backlight module 9.

SUMMARY OF THE INVENTION

It is an object of the present invention to provide a backlight module capable of guiding and transferring heat generated by high-density light sources.

It is another object of the present invention to provide a backlight module having a larger contact area between a light source module and a supporting frame.

It is another object of the present invention to provide an electronic device capable of guiding and transferring heat generated by high-density light sources.

The backlight module of the present invention includes a light guide plate, a light source module, a supporting frame, and a heat conductive glue layer. The light guide plate has a light-entering end. The light source module is disposed corresponding to the light-entering end and includes a flexible circuit board and a plurality of light sources. The flexible circuit board extends along the light-entering end and extends from the light-entering end toward a back side of the light guide plate; the light sources are disposed on the flexible circuit board and distributed along the light-entering end.

The flexible circuit board has a light source-bearing area and a heat-dissipating area, wherein the light sources are disposed in the light source-bearing area. The heat-dissipating area includes a first heat-dissipating portion and a second heat-dissipating portion. The heat-dissipating area has a width not smaller than a width of the light source-bearing area in a direction perpendicular to the light-entering end; however, if the light source-bearing area is regarded as a part of the heat-dissipating area, the width of the light source-bearing area is smaller than or equal to one half of the width of the heat-dissipating area. In addition, the heat-dissipating area includes a substrate and a metal layer; the flexible circuit board further has a plurality of through holes formed in the heat-dissipating area and has a heat conductive material filled therein. The metal layer further includes a first metal layer and a second metal layer, wherein the first metal layer is disposed on the substrate facing the light sources; the area of the first metal area is 80% or more of the heat-dissipating area. The second metal layer is disposed on the substrate opposite to the first metal layer and faces the supporting frame 400.

The supporting frame of the present invention has a holding portion corresponding to the light-entering end of the light guide plate, wherein the holding portion is bent and includes a top plate, a bottom plate, and a side wall connected to the top plate and the bottom plate. The bent holding portion forms an accommodation space. The light source module and the light-entering end are at least partially accommodated in the accommodation space and between the top plate and the bottom plate, wherein the light source module may be connected to at least one of the bottom plate, the top plate, and the side wall and fastened to the supporting frame. Furthermore, the heat conductive glue layer is disposed between the flexible circuit board and an inner side of the holding portion for fastening the light source module to the holding portion and for attaching the light source-bearing area and/or at least a portion of the heat-dissipating area of the flexible circuit board to the inner side of the holding portion.

The light source-bearing area is located between the first heat-dissipating portion and the second heat-dissipating portion, wherein the first heat-dissipating portion is on one side of the light sources that faces the light-entering end, and is connected to the bottom plate of the holding portion through the heat conductive glue layer. The second heat-dissipating portion is bent relative to the first heat-dissipating portion and is connected to at least one of the side wall and the top plate. The light source-bearing area is connected to the bottom plate or the side wall of the holding portion through the heat conductive glue layer.

In the present invention, the flexible circuit board, the heat conductive glue layer, and the holding portion of the backlight module constitute at least one heat-dissipating path, wherein the connection among the first heat-dissipating portion, the heat conductive glue layer, and the bottom layer constitutes a first heat-dissipating path of the backlight module of the present invention; the connection among the second heat-dissipating path, the heat conductive glue layer, and the top plate and/or side wall constitutes a second heat-dissipating path of the backlight module of the present invention; the connection among the light source-bearing area, the heat conductive glue layer, and the bottom plate/side wall constitutes a third heat-dissipating path of the backlight module of the present invention.

The electronic device of the present invention includes the backlight module mentioned above and a system housing.

The flexible circuit board of the electronic device may have the light source-bearing area located between the first heat-dissipating portion and the second heat-dissipating portion, or have both the first heat-dissipating portion and the second heat-dissipating portion next to each other on one side of the light sources that faces the light-entering end. The first heat-dissipating portion adjacent to the second heat-dissipating portion is connected to the bottom plate of the holding portion through the heat conductive glue layer while the second heat-dissipating portion may protrude out the bottom plate to be connected to the system housing behind the backlight module.

In the present invention, the system housing, the flexible circuit board, the heat conductive glue layer, and the holding portion together constitute at least one heat-dissipating path for the backlight module and/or the electronic device, wherein the connection among the first heat-dissipating portion, the heat conductive glue layer, and the bottom layer constitutes the first heat-dissipating path; the connection among the second heat-dissipating path, an auxiliary heat conductive glue layer, and the system housing constitutes the second heat-dissipating path; the connection among the light source-bearing area, the heat conductive glue layer, and the bottom plate/side wall constitutes the third heat-dissipating path.

DETAILED DESCRIPTION OF THE PREFERRED EMBODIMENT

Figure 1A:
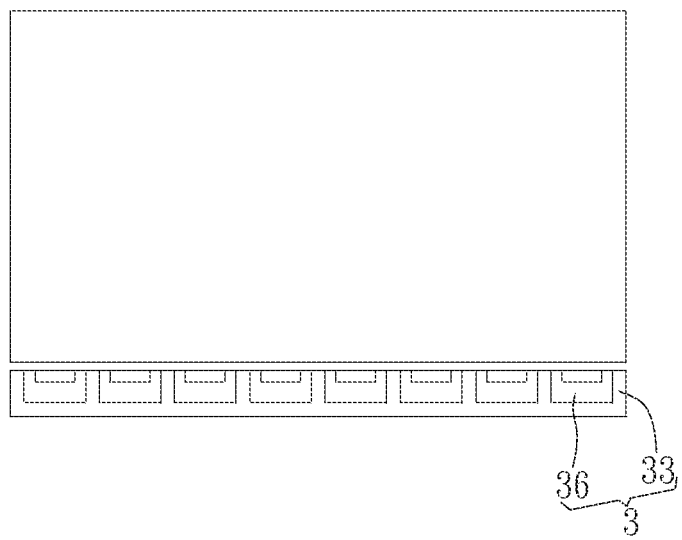
FIGS. 1A-1B show schematic views of a conventional backlight module.
Figure 1B:
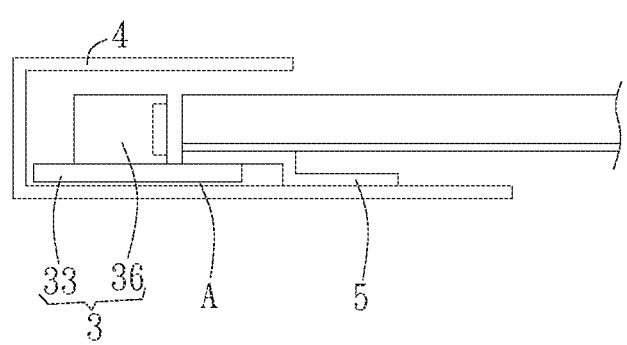
Figure 2A:
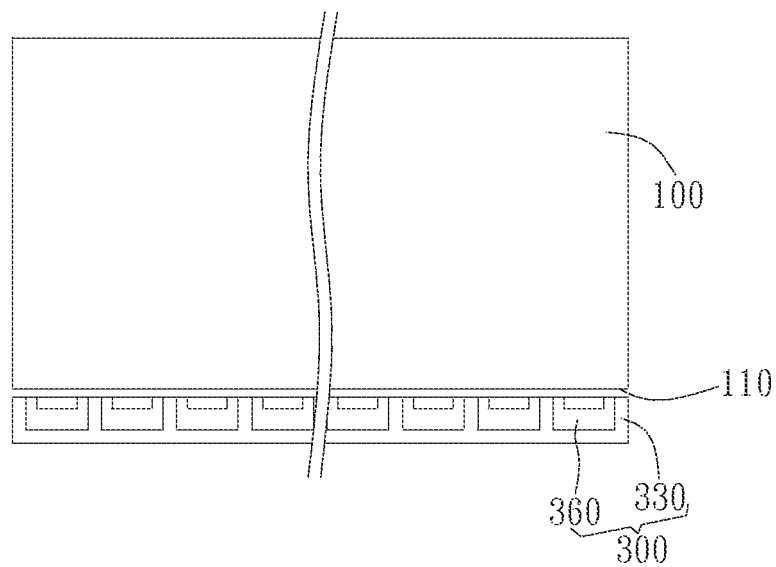
FIGS. 2A-2B are schematic views of the embodiment of the backlight module of the present invention.
Figure 2B:
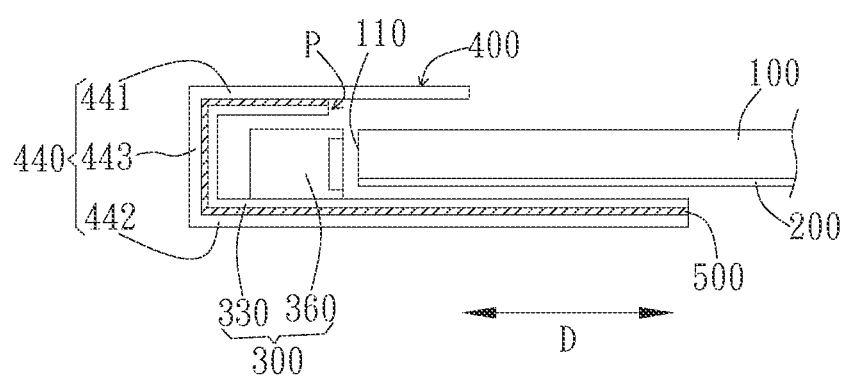

As shown in FIGS. 2A and 2B, the embodiment of the backlight module 10 of the present invention includes a light guide plate 100 and a light source module 300, and further includes a supporting frame 400 and a heat conductive glue layer 500. The light guide plate 100 has a light-entering end 110. The light source module is disposed corresponding to the light-entering end 110 and includes a flexible circuit board 330 and a plurality of light sources 360, wherein the flexible circuit board 330 extends along the light-entering end 110; the plurality of light sources 360 are disposed on the flexible circuit board 330. In the preferred embodiment, the light sources 360 are light-emitting diodes (LED), wherein sixty LEDs disposed in the light source module 300 approximately have a brightness of 400 nits or more.

Figure 2C:
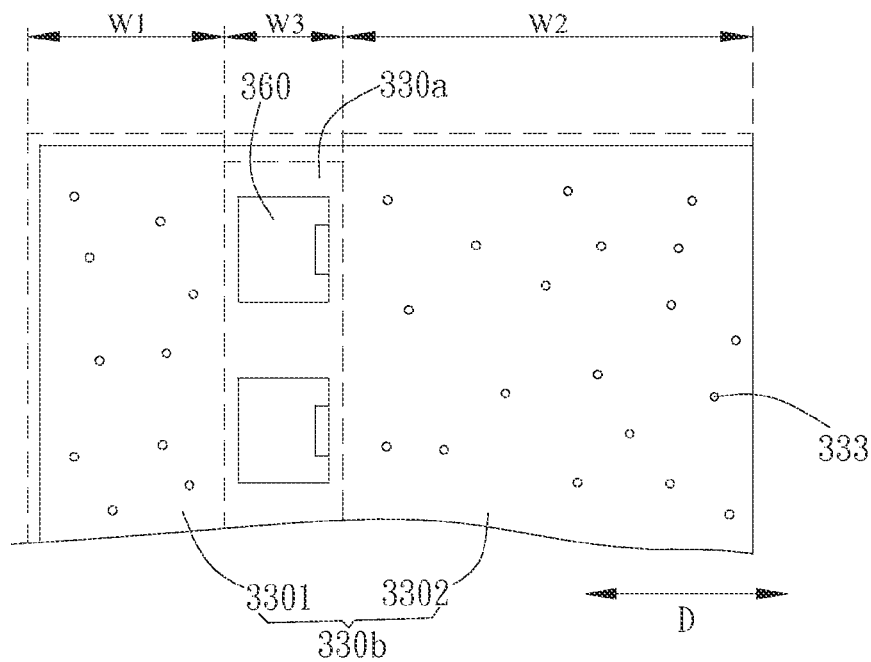
FIG. 2C is a schematic view of the embodiment of the light source module of the present invention.

As the light source module 300 shown in FIGS. 2B and 2C, in which the flexible circuit board is unfolded into a plane, the flexible circuit board 330 extends from the light-entering end 110 toward a back side of the light guide plate 100, or extends to pass the light-entering end 110 toward the back side of the light guide plate 100. In addition, the flexible circuit board 330 has a light source-bearing area 330a and a heat-dissipating area 330b. The plurality of light sources 360 are disposed in the light source-bearing area 330a which preferably includes a minimum area for bearing circuits. The heat-dissipating area 330b may include an area for bearing a part of the circuit; however, the heat-dissipating area 330b is preferably an area of the flexible circuit board 330 not for bearing the light sources 360 and the circuits. In other words, compared to the conventional flexible circuit board, which merely has a light source-bearing area, the backlight module 10 of the present invention further includes the heat-dissipating area 330b in addition to the light source-bearing area 330a. The heat-dissipating area 330b has a width (W1 plus W2) not smaller than a width W3 of the light source-bearing area 330a in a direction D perpendicular to the light-entering end 110; however, the light source-bearing area 330a may be regarded as a part of the heat-dissipating area 330b. In such case, the width W3 of the heat-bearing area 330s is smaller than one half of the width (W1 plus W2 plus W3) of the light source-dissipating area 330b in the direction D.

Figure 2D:
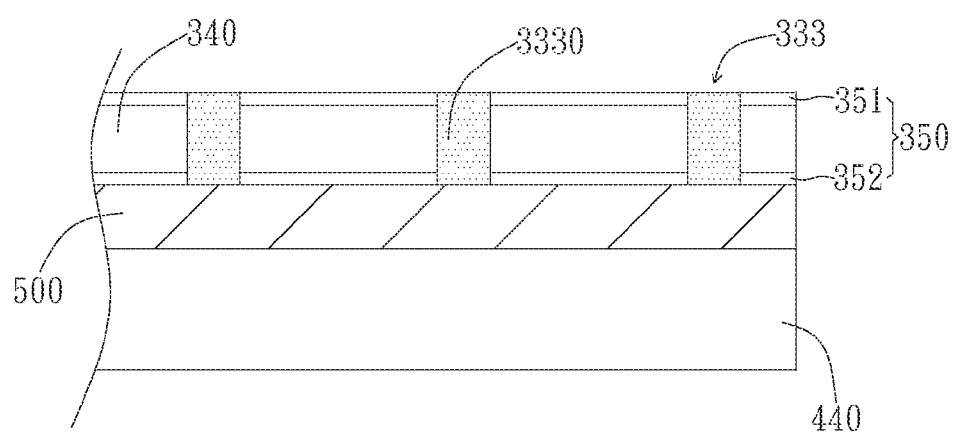
FIGS. 2D-2E are cross-sectional views of the embodiment of the backlight module of the present invention.
Figure 2E:
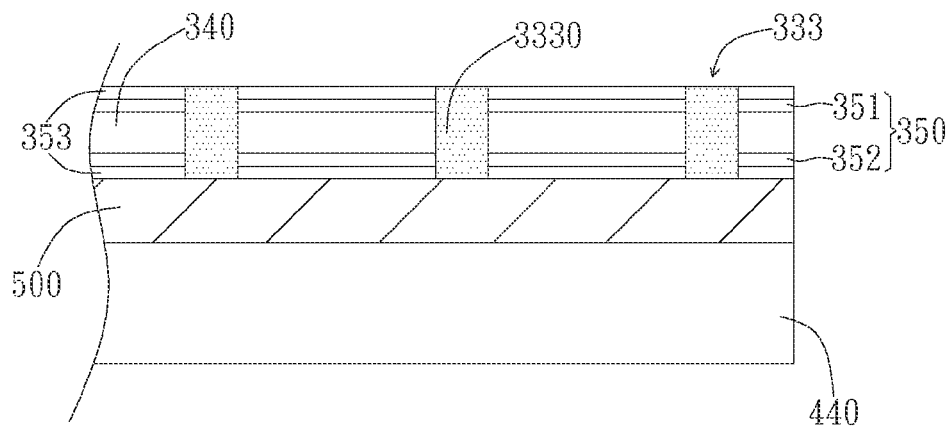

The flexible circuit board 330 includes a substrate composed of material(s) selected from polyester (PET), polyimide (PI), and a combination thereof, as well as a metal layer such as a copper layer and an attaching layer composed of material(s) selected from epoxy, polyester, acrylic, and a combination thereof. As FIG. 2D shows, the heat-dissipating area 330b or the light source-bearing area 330a of the flexible circuit area 330 also include a substrate 340 and a metal layer 350, wherein the metal layer 350 in the heat-dissipating area 330b includes a first metal layer 351 disposed on the substrate 350 facing the light sources 360; the area of the first metal layer 351 is 80% or more of the heat-dissipating area 330b. The light source-bearing area 330a also has a first metal layer for signal transmitting, wherein the first metal layer in the light source-bearing area 330a is not connected to the first metal layer 351 of the heat-dissipating area 330b. In addition, the metal layer 350 in the heat-dissipating area 330b includes a second metal layer 352 disposed on the substrate 340 opposite to the first metal layer 351 and facing the supporting frame 400. Furthermore, as shown in FIG. 2E, an insulation layer 353 may be disposed on the first metal layer 351 or the second metal layer 352 to partially or completely cover the metal layer 350.

The flexible circuit board 330 has a plurality of through holes 333 formed in the heat-dissipating area 330b. The through holes 333 are filled with filler, which has a heat-conduction coefficient greater than the heat-conduction coefficient of the substrate 340 and is preferably a heat conductive material 3330. In addition, the through holes 333 preferably have openings on the first metal layer 351 and the second metal layer 352 as the embodiment shown in FIG. 2D. On the other hand, the through holes 333 may have openings on the insulation layer 353, which covers the first metal layer 351 or the second metal layer 352 as the embodiment shown in FIG. 2E. In such circumstance, the first metal layer 351, the heat conductive material 3330 in the through holes 333, and the second metal layer 352 together constitute a good heat-transferring path. The heat-dissipating area 330b established by the first metal layer 351, the second metal layer 352, and the heat conductive material 3330 in the through holes 333 can effectively guide heat generated from the light source module 300, especially the light sources 360.

As the embodiment shown in FIG. 2B, the backlight module 10 of the present invention also includes a supporting frame 400. The supporting frame 400 has a holding portion 440 corresponding to the light-entering end 110 of the light guide plate 100. In details, the holding portion 440 of the supporting frame 400 is bent to form an accommodation space P. The light-entering end 110 and the light source module 300 are accommodated in the accommodation space P. Moreover, the bent holding portion 440 includes a top plate 441, a bottom plate 442, and a side wall 443 connected to the top plate 441 and the bottom plate 442, wherein the light source module 300 and the light-entering end 110 of the light guide plate 100 are located between the top plate 441 and the bottom plate 442. Moreover, the light source module 300 may be connected to the top plate 441, the bottom plate 442, or the side wall 443 to be fastened to the supporting frame 400. The contact area formed by the connection of the light source module 300 and the supporting frame 400 has a size depending on the size of the flexible circuit board 330, wherein the term "contact" may include a direct contact or an indirect contact between the flexible circuit board 330 and the holding portion 440 of the supporting frame 400.

The backlight module 10 of the present invention also includes a heat conductive glue layer 500 disposed between the flexible circuit board 330 and an inner side of the holding portion 440 to fasten the light source module 300 to the holding portion 440, and to prevent the formation of an air layer between the flexible circuit board 330 and the holding portion 440 where the glue layer is disposed. Moreover, depending on the size of the flexible circuit board, the heat conductive glue layer 500 can be disposed other portion of the supporting frame 400 in addition to the holding portion 440. The heat conductive glue layer 500 can be composed of double-sided adhesive tape or heat conductive glue, wherein the double-sided adhesive tape or the heat conductive glue may contain metal particles to enhance thermal conductivity of the heat conductive glue layer 500. Because the heat-conduction coefficient of the double-sided adhesive tape or the heat conductive glue is greater than the heat-conduction coefficient (about 0.024 to 0.026 W/m·K) of the air, the heat conductive glue layer 500 contributes to transfer the heat generated from the light source module 300 from the flexible circuit board 330 to the supporting frame 400. On the other hand, the supporting frame 400 is preferably made of metal or composite material with good thermal conductivity.

Figure 3:
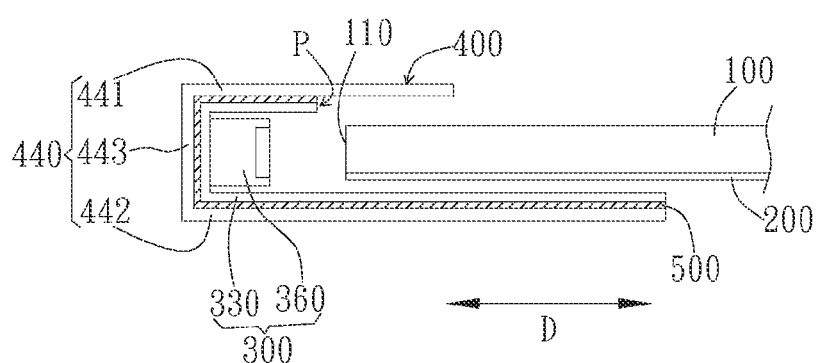
FIG. 3 is a schematic view of another embodiment of the backlight module of the present invention.

Moreover, the heat conductive glue layer 500 is disposed between the light source-bearing area 330 and/or at least a portion of the heat-dissipating area 330b of the flexible circuit board 330 and the inner side of the holding portion 440, so that the light source-bearing area 330 and/or the at least a portion of the heat-dissipating area 300b can be attached to the inner side of the holding portion 440 by means of the heat conductive glue layer 500. With regard to the light source-bearing area 330a, as FIG. 2B shows, a bottom face of the light source-bearing area 330a may be attached to an inner side of the bottom plate 442 of the holding portion 440 by means of the heat conductive glue layer 500, wherein the light sources 360 may be side-emitting light sources and are fastened to the bottom plate 442 of the holding portion 440. In other embodiments, as FIG. 3 shows, the bottom face of the light source-bearing area 330a may be attached to an inner side of the side wall 443 of the holding portion 440 by means of the heat conductive glue layer 500, wherein the light sources 360 may be top-emitting light sources and are fastened to the side wall 443 of the holding portion 440. With regard to the heat-dissipating area 330b, it can be attached to at least one of the top plate 441, the bottom plate 442, and the side wall 443 by means of the heat conductive glue layer 500. In addition, as mentioned above that the metal layer 350 in the heat-dissipating area 330b includes the first metal layer 351, the second metal layer 352, and the through holes 333 filled with heat conductive material 3330, the heat-dissipating area 330b can effectively dissipate the heat generated from the light source module 300. In the preferred embodiment, as FIGS. 2D-2E show, the second metal layer 352 which faces the supporting frame 400 is attached to the inner side of the holding portion 440 through the heat conductive glue layer 500. As a result, the heat is more effectively guided and transferred away from the flexible circuit board 330 or the light source module 300 by means of the heat conductive glue layer 500 disposed between the heat-dissipating area 330b and the inner side of the holding portion 440 in a manner of contact conduction. However, the light source-bearing area 330a may be regarded as a part of the heat-dissipating area 330b, the heat conductive glue layer 500 disposed between the light source-bearing area 330a and the inner side of the holding portion 440 also transfers the heat away from the flexible circuit board 330 or the light source module 300.

As FIGS. 2B-2C show, the heat-dissipating area 330b includes a first heat-dissipating portion 3301 and a second heat-dissipating portion 3302. The light source-bearing area 330a is located between the first heat-dissipating portion 3301 and the second heat-dissipating portion 3302, wherein the first heat-dissipating portion 3301 is located on one side of the light sources 360 which faces the light-entering end 110 and has a width W1; the second heat-dissipating portion 3302 is located on another side of the light sources 360 which faces away from the light entering end 110 and has a width W2. The second heat-dissipating portion 3302 is bent relative to the first heat-dissipating portion 3301. In addition, the first heat-dissipating portion 3301 is connected to the bottom plate 442 of the holding portion 440 through the heat conductive glue layer 500; the second heat-dissipating portion 3302, which is bent along with the bending of the flexible circuit board 330, is connected to the side wall 443 or the top plate 441 of the holding portion 440. A sum of the width of the first heat-dissipating portion 3301 W1 and the width of the second heat-dissipating portion 3302 W2 is greater than or equal to the width of the light source-bearing area 330a W3.

By means of the above-mentioned flexible circuit board 330, the heat conductive glue layer 500, and the holding portion 440 of the backlight module 10, the present invention provides at least one heat-dissipating path in the backlight module 10, as shown in FIG. 4, to guide and transfer the heat generated by high-density light sources.

Figure 4A:
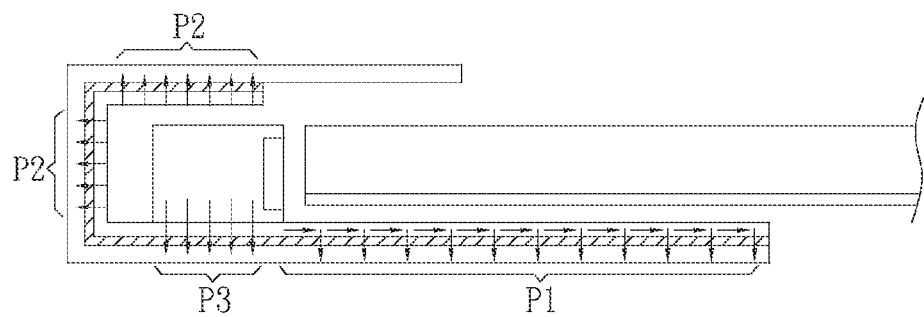
FIG. 4A is a schematic view of the embodiment of the heat-dissipating path of the backlight module of the present invention.

FIG. 4 demonstrates a heat-dissipating path of the embodiment shown in FIG. 2B. As FIGS. 2B-2C show, the first heat-dissipating portion 3301 of the heat-dissipating area 330b is attached to the inner side of the bottom plate 442 through the heat conductive glue layer 500. As a result, the connection among the first heat-dissipating portion 3301, the heat conductive glue layer 500, and the bottom plate 442 constitutes a first heat-dissipating path P1 of the backlight module 10 of the present invention, as shown in FIG. 4A. In accordance with the first heat-dissipating path P1, the heat generated from the light source module 300, specifically near the light sources, is effectively dissipated from the heat generation area. For example, when the heat generation area is defined as near the light sources 360, as shown in FIG. 4A, the heat is transferred away from the light sources 360 through the heat-dissipating area 330a; on the other hand, the heat is transferred away from the flexible circuit board 330 or the light source module 300 by means of the heat conductive glue layer 500 or the heat conductive glue layer 500 and the bottom plate 442 of the holding portion 440.

In the embodiment shown in FIGS. 2B-2C, the heat-dissipating area 330b is bent along with the bending of the flexible circuit board 330 so that the second heat-dissipating portion 3302 is attached to the side wall 443 or the top plate 441 of the holding portion 440. As a result, the connection among the second heat-dissipating portion 3302, the heat conductive glue layer 500, and the top plate 441 and/or side wall 443 constitutes a second heat-dissipating path P2 of the backlight module 10 of the present invention, as shown in FIG. 4A. In accordance with the second heat-dissipating path P2, the heat generated from the light source module 300, specifically near the light sources, is effectively dissipated from the heat generation area and the flexible circuit board 330, further being dissipated away from the backlight module 10.

In addition to the heat-dissipating area 330b, the light source-bearing area 330a having the light sources 360 disposed therein may be attached to the inner side of the holding portion 440 by means of the heat conductive glue layer 500. As the embodiment shown in FIGS. 2B and 3, the light source-bearing area 330a may be attached to the bottom plate 442 or the side wall 443 of the holding portion 440. As a result, the connection among the light source-bearing area 330a, the heat conductive glue layer 500, and the top plate 441/side wall 443 constitutes a third heat-dissipating path P3 of the backlight module 10 of the present invention, as shown in FIG. 4A. In the preferred embodiment, in accordance with the third heat-dissipating path P3, the heat leaves directly from the flexible circuit board 330 or the light source module 300. Alternatively, the heat leaves from the light sources, i.e. where the heat is generated, through the third heat-dissipating path P3 and then leaves the flexible circuit board 330 or the light source module 300 through the first dissipating path P1 or the second heat-dissipating path P2. Since the light source-bearing area 330a may be regarded as a part of the heat-dissipating area 330b, the third heat-dissipating path P3 may be regarded as a heat-dissipating path constituted by a part of the heat-dissipating area 330b that contacts the light sources 360, the heat conductive glue layer 500, and the holding portion 440.

Figure 4B:
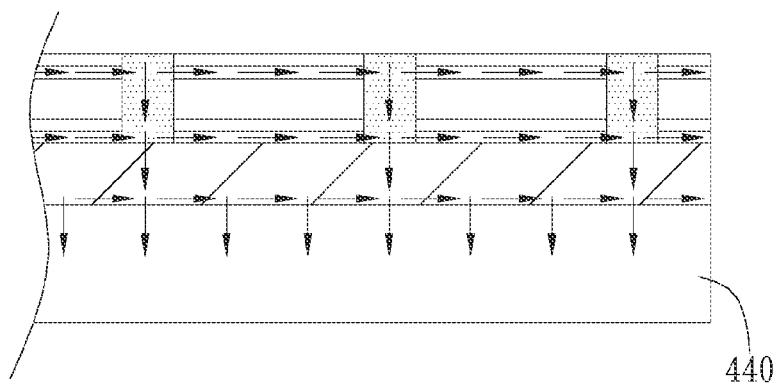
FIG. 4B is a schematic view of the embodiment of a partial heat-dissipating path of the backlight module of the present invention.

Furthermore, as mentioned above and shown in FIGS. 2D-2E, the heat-dissipating area 330b of the flexible circuit board 330 includes the first metal layer 351, the second metal layer 352, and the through holes 333 filled with heat conductive material 3330. In the preferred embodiment, as FIGS. 4A-4B show, along the above-mentioned heat-dissipating paths P1, P2, and P3, the heat is guided and transferred away from the light sources 360 through the heat-dissipating area 330a composed of the first metal layer 351, the second metal layer 352, and the through holes 333 filled with the heat conductive material; on the other hand, the heat is also guided and transferred away from the flexible circuit board 330 or the light source module 300 through the heat conductive glue layer 500 or the heat conductive glue layer 500 as well as the holding portion 440, wherein the heat conductive material 3330 and/or the second metal layer 352 further enhances heat conduction efficiency.

Figure 6:
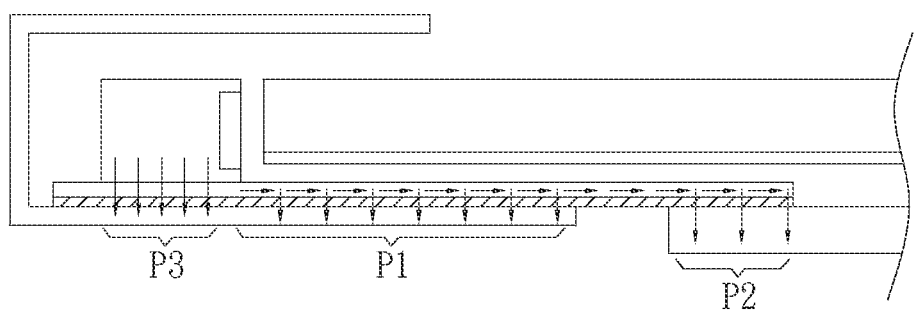
FIG. 6 is a schematic view of the embodiment of another heat-dissipating path of the backlight module of the present invention.

Moreover, the present invention further utilizes a system housing 60 together with the flexible circuit board 330, the heat conductive glue layer 500, and the holding portion 440 to establish at least one heat-dissipating path for the backlight module 10 and/or the electronic device 1, as shown in FIG. 6, so as to guide and transfer the heat generated from high-density light sources.

Figure 5A:
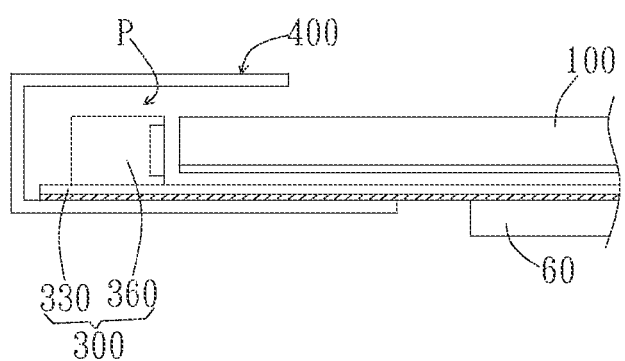
FIG. 5A is a schematic view of another embodiment of the backlight module of the present invention.
Figure 5B:
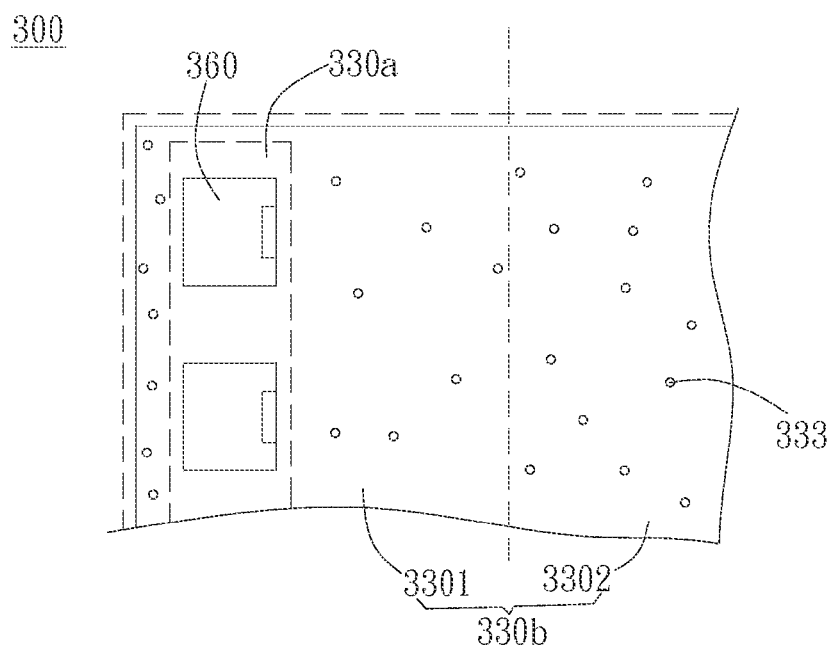
FIG. 5B is a schematic view of the embodiment of the light source module of the present invention.

In the embodiments shown in FIGS. 5A-5B, the first heat-dissipating portion 3301 and the second heat-dissipating portion 3302 are next to each other and both located on one side of the light sources 360 that faces the light-entering end 110, wherein the first heat-dissipating portion 3301 is connected to the bottom plate 442 of the holding portion 440 through the heat conductive glue layer 500. The second heat-dissipating portion 3302 protrudes out the bottom plate 442 for being connected to, for example, the system housing 60 that is located behind the backlight module 10. In the preferred embodiment, the system housing 60 may be, for example, an outer casing of the electronic device 1 (e.g. tablet computer) or other supporting structure of the backlight module 10, such as a back bezel. In addition, the heat conductive glue layer is further disposed between the second heat-dissipating portion 3302 and an inner side of the system housing 60. On one hand, the second heat-dissipating portion 3302 may be attached to the inner side of the system housing 60 by means of such an auxiliary heat conductive glue layer 500; on the other hand, heat may be transferred from the second heat-dissipating portion 3302 to the system housing 60 through the auxiliary heat conductive glue layer 500. The sum of the width of the first heat-dissipating portion 3301 and the width of the second heat-dissipating portion 3302 is greater than or equal to the width of the light source-bearing area 330a.

FIG. 6 demonstrates a heat-dissipating path of the embodiment shown in FIG. 5A, wherein the heat-dissipating area 330b of the flexible circuit board 330 of the embodiment has the first metal layer 351, the second metal layer 352, and the through holes 333 having the heat conductive material 3330 disposed therein. Furthermore, as shown in FIGS. 5A-5B, the first heat-dissipating portion 3301 of the heat-dissipating area 330b is attached to the inner side of the bottom plate 442 through the heat conductive glue layer 500. As a result, the connection among the first heat-dissipating portion 3301, the heat conductive glue layer 500, and the bottom plate 442 constitutes the first heat-dissipating path P1 of the backlight module 10 of the present invention, as shown in FIG. 6. In addition, as shown in FIGS. 5A-5B, the second heat-dissipating portion 3302 protrudes out the bottom plate 442 and is attached to the inner side of the system housing 60 behind the backlight module 10. As a result, the connection among the second heat-dissipating portion 3302, the auxiliary heat conductive glue layer 500, and the system housing 60 constitutes the second heat-dissipating oath P2 of the backlight module 10 of the present invention. Since the system housing 60 such as the back bezel or the outer casing usually is a heat conductor having greater area, the second heat-dissipating oath P2 is another effective path for heat conduction.

In the embodiment shown in FIGS. 5A-5B, the connection among the light source-bearing area 330a, the heat conductive glue layer 500, and the inner side of the holding portion 440 also constitutes the third heat-dissipating path P3, as shown in FIG. 6. The heat may leave directly from the flexible circuit board 330 or the light source module 300 along the third heat-dissipating path P3; alternatively, heat may leave from the flexible circuit board 330 or the light source module 300 along the third heat-dissipating path P3, the first heat-dissipating path P1, or the second heat-dissipating path P2 depending on the distance to the heat generation area. In addition, since the light source-bearing area 330a may be regarded as a part of the heat-dissipating area 330b, the third heat-dissipating path P3 may be regarded as the heat-dissipating path constituted by the part of the heat-dissipating area 330b that contacts the light source 360, the heat conductive glue layer 500, and the holding portion 440.

Although the preferred embodiments of present invention have been described herein, the above description is merely illustrative. The preferred embodiments disclosed will not limited the scope of the present invention. Further modification of the invention herein disclosed will occur to those skilled in the respective arts and all such modifications are deemed to be within the scope of the invention as defined by the appended claims.

What is claimed is:

1. A backlight module, comprising:
   a light guide plate having a light-entering end;
   a light source module disposed corresponding to the light-entering end, including:
   a flexible circuit board extending from the light-entering end toward a back side of the
   light guide plate; wherein the flexible circuit board has a light source-bearing area and a heat-dissipating area respectively extending along the light-entering end, the heat-dissipating area has a width greater than or equal to a width of the light source-bearing area in a flexible circuit board's extending direction perpendicular to the light-entering end, extends away from the light source-bearing area and is bendable; and
   a plurality of light sources disposed in the light source-bearing area and distributed
   along the light-entering end;
   a supporting frame having a holding portion corresponding to the light-entering end; wherein the holding portion is bent to form an accommodation space, the light source module and the light-entering end are accommodated in the accommodation space; and
   a heat conductive glue layer disposed between the heat-dissipating area and an inner side of the holding portion to transfer heat from the heat-dissipating area to the holding portion.

2. The backlight module of claim 1, wherein the holding portion includes a top plate, a bottom plate, and a side wall connected to the top plate and the bottom plate, the light source module and the light-entering end are disposed between the top plate and the bottom plate, at least a portion of the heat-dissipating area is attached to an inner side of the bottom plate by means of the heat conductive glue layer.

3. The backlight module of claim 2, wherein the heat-dissipating area includes a first heat-dissipating portion and a second heat-dissipating portion, the light source-bearing area is located between the first heat-dissipating portion and the second heat-dissipating portion, the first heat-dissipating area is connected to the bottom plate through the heat conductive glue layer, the second heat-dissipating portion is bent relative to the first heat-dissipating portion and is connected to at least one of the side wall and the top plate through the heat conductive glue layer.

4. The backlight module of claim 2, wherein the heat-dissipating area includes a first heat-dissipating portion and a second heat-dissipating portion, the first heat-dissipating portion is connected to the bottom plate through the heat conductive glue layer, the second heat-dissipating portion extends from the first heat-dissipating portion, away from the light source-bearing area, and protrudes out the bottom plate.

5. An electronic device, comprising:
   the backlight module of claim 4;
   a system housing disposed at a back side of the backlight module; and
   an auxiliary heat conductive glue layer disposed between the second heat-dissipating portion and an inner face of the system housing to transfer heat from the heat-dissipating portion to the system housing.

6. The backlight module of claim 2, wherein a bottom face of the light source-bearing area is connected to the inner side of the bottom plate or the side wall through the heat conductive glue layer.

7. The backlight module of claim 1, wherein the heat-dissipating area comprises:
   a substrate; and
   a first metal layer disposed on the substrate at one side facing the light sources; wherein the area of the first metal layer is 80% or more of the area of the heat dissipating area.

8. The backlight module of claim 7, wherein the heat-dissipating area comprises a second metal layer disposed on the substrate opposite to the first metal layer, the second metal layer is directly connected to the inner side of the holding portion by means of the heat conductive glue layer.

9. The backlight module of claim 1, wherein the heat-dissipating area has a plurality of through holes filled with a heat conductive material.

10. A backlight module, comprising:
    a light guide plate having a light-entering end;
    a light source module disposed corresponding to the light-entering end, including:
    a flexible circuit board extending from the light-entering end toward a back side of the light guide plate; wherein the flexible circuit board has a light source-bearing area, a first heat-dissipating portion, and a second heat-dissipating portion respectively extending along the light-entering end; wherein the first heat-dissipating portion and the second heat-dissipating portion extends in a flexible circuit board's extending direction and away from the light source-bearing area and is bendable; and
    a plurality of light sources disposed in the light source-bearing area and distributed
    along the light-entering end;
    a supporting frame having a holding portion corresponding to the light-entering end; wherein the holding portion is bent to form an accommodation space, the light source module and the light-entering end are accommodated in the accommodation space; and
    a heat conductive glue layer at least disposed between the first heat-dissipating portion and an inner side of the holding portion to constitute a first heat-dissipating path; the second heat-dissipating portion provides a second heat-dissipating path distinct from the first heat-dissipating path.

11. The backlight module of claim 10, wherein the holding portion has a top plate, a bottom plate, and a side wall connected to the top plate and the bottom plate, the light source module and the light-entering end are disposed between the top plate and the bottom plate, the first heat-dissipating portion is attached to an inner side of the bottom plate by means of the heat conductive glue layer to constitute the first heat-dissipating pathway.

12. The backlight module of claim 11, wherein the light source-bearing area is located between the first heat-dissipating portion and the second heat-dissipating portion, the second heat-dissipating portion is bent relative to the first heat-dissipating area and is connected to at least one of the side wall and the top plate through the heat conductive glue layer to constitute the second heat-dissipating path.

13. The backlight module of claim 11, wherein the second heat-dissipating portion extends from the first heat-dissipating portion, away from the light source-bearing area, and protrudes out the bottom plate to constitute the second heat-dissipating path.

14. An electronic device, comprising:
the backlight module of claim 13;
a system housing disposed at a back side of the backlight module; and
an auxiliary heat conductive glue layer disposed between the second heat-dissipating
portion and an inner face of the system housing to constitute the second heat-dissipating path.

15. The backlight module of claim 11, wherein a bottom face of the light source-bearing area is connected to the inner side of the bottom plate or the side wall through the heat conductive glue layer to constitute a third heat-dissipating path.

16. The backlight module of claim 10, wherein the heat-dissipating area includes:
a substrate; and
a first metal layer disposed on the substrate facing the light sources; wherein the area of the first metal layer is 80% or more of the area of the heat-dissipating area.

17. The backlight module of claim 16, wherein the heat-dissipating area comprises a second metal layer disposed on the substrate opposite to the first metal layer, the second metal layer is directly connected to the inner side of the holding portion by means of the heat conductive glue layer.

18. The backlight module of claim 10, wherein the heat-dissipating area has a plurality of through holes filled with a heat conductive material.

* * * * *